United States Patent
Huang

(10) Patent No.: US 7,515,384 B2
(45) Date of Patent: Apr. 7, 2009

(54) METHOD AND APPARATUS FOR PROVIDING A THREE STEPPED AIR BEARING HAVING A FUNNEL STRUCTURE FOR CONTROLLING AIR FLOW TO IMPROVE FLY HEIGHT PERFORMANCE

(75) Inventor: Weidong Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 106 days.

(21) Appl. No.: 10/909,006

(22) Filed: Jul. 30, 2004

(65) Prior Publication Data

US 2006/0023358 A1    Feb. 2, 2006

(51) Int. Cl.
*G11B 5/60* (2006.01)
(52) U.S. Cl. .................. 360/235.6; 360/235.7; 360/236
(58) Field of Classification Search ... 360/235.6–235.7, 360/236.4, 236, 236.3
See application file for complete search history.

(56) References Cited

U.S. PATENT DOCUMENTS

| | | | |
|---|---|---|---|
| 5,128,822 A | 7/1992 | Chapin et al. | |
| 5,726,831 A | 3/1998 | White | |
| 5,917,678 A | 6/1999 | Ito et al. | |
| 5,949,614 A * | 9/1999 | Chhabra | 360/235.6 |
| 6,004,472 A | 12/1999 | Dorius et al. | |
| 6,021,020 A | 2/2000 | Itoh et al. | |
| 6,055,128 A | 4/2000 | Dorius et al. | |
| 6,483,667 B1 | 11/2002 | Berg et al. | |
| 6,525,909 B1 | 2/2003 | Qian et al. | |
| 6,583,961 B2 | 6/2003 | Levi et al. | |
| 6,680,821 B2 | 1/2004 | Kang | |
| 6,956,719 B2 * | 10/2005 | Mundt et al. | 360/236.3 |
| 6,999,282 B2 * | 2/2006 | Rao | 360/236 |
| RE39,004 E * | 3/2006 | Park et al. | 360/235.6 |
| 2003/0053253 A1 | 3/2003 | Mundt et al. | |
| 2004/0012887 A1 | 1/2004 | Rajakumar et al. | |
| 2004/0027724 A1 * | 2/2004 | Pendray et al. | 360/236.3 |

* cited by examiner

*Primary Examiner*—A. J. Heinz
(74) *Attorney, Agent, or Firm*—Merchant & Gould

(57) ABSTRACT

A method and apparatus for providing a three step air bearing with improved fly height performance is disclosed. The slider includes a funnel structure for directing air flow to a predetermined location toward a trailing edge of the slider and a collection structure for gathering air flow at the predetermined location. The slider is formed using three etch depths. A crossrail and side rails may be provided. The elements of the slider form five negative pressure areas to provide improved air bearing stiffness and minimize fly height sigma performance. The collection structure includes angled sides and the side rails further include trailing ABS side angles, wherein the trailing ABS side angles and the angled sides of the collection structure directing air flow around the collection structure to prevent contamination buildup.

26 Claims, 8 Drawing Sheets

METHOD AND APPARATUS FOR PROVIDING A THREE STEPPED AIR BEARING HAVING A FUNNEL STRUCTURE FOR CONTROLLING AIR FLOW TO IMPROVE FLY HEIGHT PERFORMANCE

BACKGROUND OF THE INVENTION

1. Field of the Invention

This disclosure relates in general to air bearing pads for magnetic storage devices, and more particularly to a method and apparatus for providing a three step air bearing with improved fly height performance 2. Description of Related Art Fixed magnetic storage systems are now commonplace as a main non-volatile storage in modern personal computers, workstations, and portable computers. Storage systems are now capable of storing gigabyte quantities of digital data, even when implemented in portable computers.

Magnetic recording systems that utilize magnetic disk and tape drives constitute the main form of data storage and retrieval in present-day computer and data processing systems. Many important advances have been made that provide higher data density and thus increased storage capacities for storage systems. These advances include faster access speeds and faster access times resulting in a greater bandwidth of data communicated to and from the storage systems. Advances have also been made by greatly reducing the size and weight of the storage systems, resulting in the availability of ultra-light portable computers having state-of-the art capabilities and performance.

A disk drive is one example of a magnetic storage system. A disk drive storage system, for example, uses a rotatable disk with concentric data tracks containing information, a head for reading and/or writing data onto the various tracks, and an actuator connected to a sensor for moving the sensor to a desired track and maintaining the sensor over the track centerline during read and write operations. The sensor is suspended in close proximity to a recording medium. For example, the sensor may be suspended over a magnetic disk having a plurality of concentric tracks. Another type of magnetic storage system includes a magnetic tape system. However, storage systems are not limited merely to the above-mentioned magnetic storage systems.

Disk drive storage systems utilize thin film head designs that are mostly variations of a merged design or a piggyback design. The merged design, as well as the piggyback design, places a write element atop a read sensor. In these dual-element designs, an inductive coil element used for writing and a magnetoresistive (MR) element used for reading are spaced apart from one another in a direction perpendicular to the trailing end of the merged head.

In the recording process, information is written and stored as magnetization patterns on the magnetic recording medium. Scanning a write head over the medium and energizing the write head with appropriate current waveforms accomplish this recording process. In a read-back process, scanning a magnetoresistive (MR) sensor over the medium retrieves the stored information. This MR read head sensor intercepts magnetic flux from the magnetization patterns on the recording medium and converts the magnetic flux into electrical signals, which are then detected and decoded.

There are typically a plurality of disks stacked on a hub that is rotated by a disk drive spindle motor. A housing supports the drive motor and head actuator and surrounds the head and disk to provide a substantially sealed environment for the head-disk interface. The head carrier is typically an air-bearing slider that rides on a bearing of air above the disk surface when the disk is rotating at its operational speed. The slider is maintained in very close proximity to the disk surface by a relatively fragile suspension that connects the slider to the actuator. The spacing between the slider and the disk surface is called the flying height and its precise value is critical to the proper function of the reading and writing process.

The inductive write head and MR read head may be patterned, for example, on the trailing end of the slider, which is the portion of the slider that flies closest to the disk surface. An important factor affecting areal density is the distance between the transducer and the recording surface, referred to as the fly height. It is desirable to fly the transducer very close to the medium to enhance transition detection. Some fly height stability is achieved with proper suspension loading and by shaping the air bearing slider surface (ABS) for desirable aerodynamic characteristics. To achieve such results, the slider may be biased toward the disk surface by a small spring force from the suspension, or "self-loaded" to the disk surface by means of a "negative-pressure" air-bearing surface on the slider.

Another important factor affecting fly height is the slider's resistance to changing conditions. An air bearing slider is subjected to a variety of changing external conditions during normal operation. Changing conditions affecting fly height include, for example, change in the relative air speed and direction, and variations in temperature. If the transducer fly height does not stay constant during changing conditions, data transfer between the transducer and the recording medium may be adversely affected. Fly height is further affected by physical characteristics of the slider such as the shape of the ABS. Careful rail shaping, for example, will provide some resistance to changes in air flow.

As can be envisioned, it is desired to minimize variation in head clearance or flying height. However, it is becoming increasingly more difficult to achieve this lower fly height due to inherent limitations of slider and media process consistency. Improved slider designs are therefore desired that can account for these inherent process limitations while providing very low and stable flying heights. No solution provides improvement to altitude, protrusion and speed performance as much as a three-step air bearing surface design. Yet, a three step air bearing in itself is not sufficient to provide the required fly height sigma and roll stiffness.

It can be seen that there is a need for a method and apparatus for providing a three step air bearing with improved fly height performance.

SUMMARY OF THE INVENTION

To overcome the limitations described above, and to overcome other limitations that will become apparent upon reading and understanding the present specification, the present invention discloses a method and apparatus for providing a three step air bearing with improved fly height performance.

The present invention solves the above-described problems by providing an air bearing design that funnels and collections air flow to improve dynamic performance. Three etch steps are used in forming the air bearing design.

A slider in accordance with the principles of an embodiment of the present invention includes a funnel structure disposed toward a leading edge of the slider for directing air flow to a predetermined location toward a trailing edge of the slider and a collection structure disposed proximate the trailing edge of the slider for gathering air flow at the predetermined location.

In another embodiment of the present invention, another slider design is provided. This slider includes a funnel structure disposed toward a leading edge of the slider for directing air flow to a predetermined location toward a trailing edge of the slider.

In another embodiment of the present invention, another slider design is provided. This slider includes a collection structure disposed proximate the trailing edge of the slider for gathering air flow at the predetermined location.

In another embodiment of the present invention, a magnetic storage system is provided. The magnetic storage system includes at least one magnetic storage medium, a motor for moving the at least one magnetic storage medium, a slider having a magnetic head mounted thereon for reading and writing data on the at least one magnetic storage medium and an actuator, coupled to the slider, for positioning the slider relative to the at least one magnetic storage medium, wherein the slider further comprises a funnel structure disposed toward a leading edge of the slider for directing air flow to a predetermined location toward a trailing edge of the slider and a collection structure disposed proximate the trailing edge of the slider for gathering air flow at the predetermined location.

In another embodiment of the present invention, another magnetic storage system is provided. This magnetic storage system includes at least one magnetic storage medium, a motor for moving the at least one magnetic storage medium, a slider having a magnetic head mounted thereon for reading and writing data on the at least one magnetic storage medium and an actuator, coupled to the slider, for positioning the slider relative to the at least one magnetic storage medium, wherein the slider further comprises a funnel structure disposed toward a leading edge of the slider for directing air flow to a predetermined location toward a trailing edge of the slider.

In another embodiment of the present invention, another magnetic storage system is provided. This magnetic storage system includes at least one magnetic storage medium, a motor for moving the at least one magnetic storage medium, a slider having a magnetic head mounted thereon for reading and writing data on the at least one magnetic storage medium and an actuator, coupled to the slider, for positioning the slider relative to the at least one magnetic storage medium, wherein the slider further comprises a collection structure disposed proximate the trailing edge of the slider for gathering air flow at the predetermined location.

In another embodiment of the present invention, a method for providing an air bearing pad with improved roll angle sigma is provided. The method includes forming a slider surface, forming a funnel structure, using a three etch process, for directing air flow to a predetermined location at a trailing edge of the slider and forming an angled collector structure, using the three etch process, at the trailing edge for collecting air flow.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a three step air bearing with improved fly height performance. The present invention uses a funnel structure and a collection structure for improving dynamic performance. Three etch steps are used in forming the air bearing design.

Figure 1:
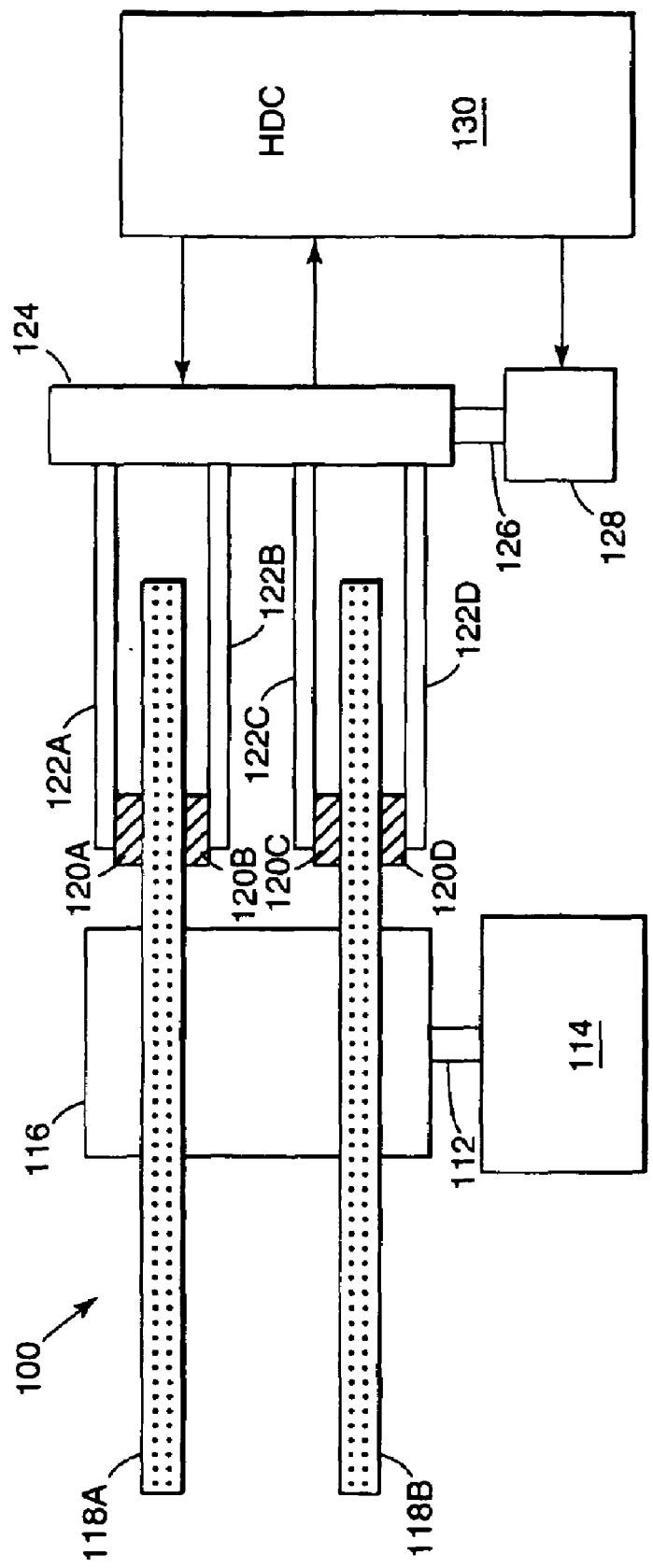
FIG. 1 illustrates a hard disk drive (HDD) including disks according to the present invention.

FIG. 1 illustrates a hard disk drive (HDD) 100 including disks 118A, 118B according to the present invention. The HDD 100 includes a disk 118 and a hard disk controller (hereinafter referred to as HDC) 130. The disk part has a motor 114 for rotating a shaft 112 at a high speed. A cylindrical support 116 is attached to the shaft 112 so that the axes are in coincidence. One or more information recording disks 118A and 118B are mounted to support 116. Magnetic heads 120A, 120B, 120C and 120D are respectively provided to face the disk surface, and these magnetic heads are supported from an actuator 124 by access arms 122A, 122B, 122C, and 122D, respectively. The individual magnetic heads 120A to 120D receive the drive force transmitted from an actuator drive device 128 by a shaft 126 and rotates about the shaft 126 as the axis of rotation, and fly over the disk 118 to a predetermined position.

Figure 2:
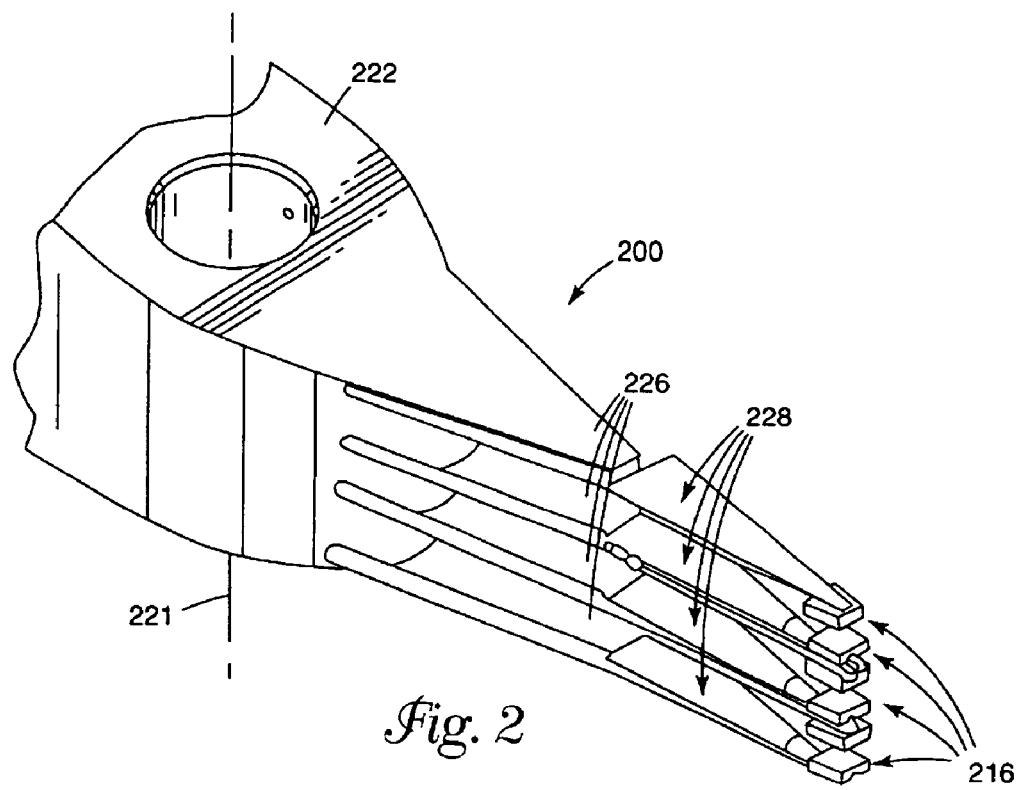
FIG. 2 is a perspective view of an actuator assembly.

FIG. 2 is a perspective view of an actuator assembly 200. Actuator assembly 200 includes base portion 222, a plurality of actuator arms 226, a plurality of load beams 228, and a plurality of head gimbal assemblies 216. Base portion 222 includes a bore that is, in the preferred embodiment, coupled for pivotal movement about axis 221. Actuator arms 226 extend from base portion 222 and are each coupled to the first end of either one or two load beams 228. Load beams 228 each have a second end, which is coupled to a head gimbal assembly 216. According to the present invention, multiple, independently controlled actuator assemblies 200 are provided in a disk drive.

Figure 3:
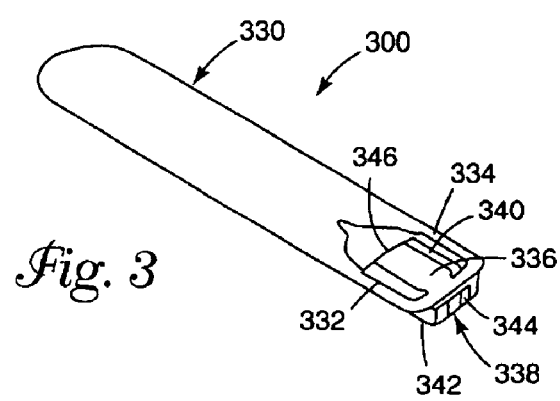
FIG. 3 illustrates a greatly enlarged view of a head gimbal assembly.

FIG. 3 illustrates a greatly enlarged view of a head gimbal assembly 300. Head gimbal assembly 300 includes gimbal 330, which has a pair of struts 332 and 334, and a gimbal bond tongue 336. Head gimbal assembly 300 also includes slider 338, which has an upper surface 340, and a lower, air bearing surface 342. Transducers 344 are also preferably located on a trailing edge of slider 338. The particular attachment between slider 338 and gimbal 330 is accomplished in any desired manner. For example, a compliant sheer layer may be coupled between the upper surface 340 of slider 338 and a lower surface of gimbal bond tongue 336, with an adhesive. A compliant sheer layer permits relative lateral motion between slider 338 and gimbal bond tongue 336. Also, gimbal bond tongue 336 preferably terminates at a trailing edge of slider 338 with a mounting tab 346 which provides a surface at which slider 338 is attached to gimbal bond tongue 336.

A conventional slider design starts off with a flat polished surface, from which a patterned ABS is created by a removal process such as etching or ion milling. The ABS is always the top most polished surface, as for example in FIG. 4 surface 478, and pressurizes with positive pressure to lift the ABS up producing an air cushion above the disk. Air bearing surfaces are formed by single or dual etch processing which result in either 2 or 3 surface levels, which are respectively lower than the top most air bearing surface.

Figure 4:
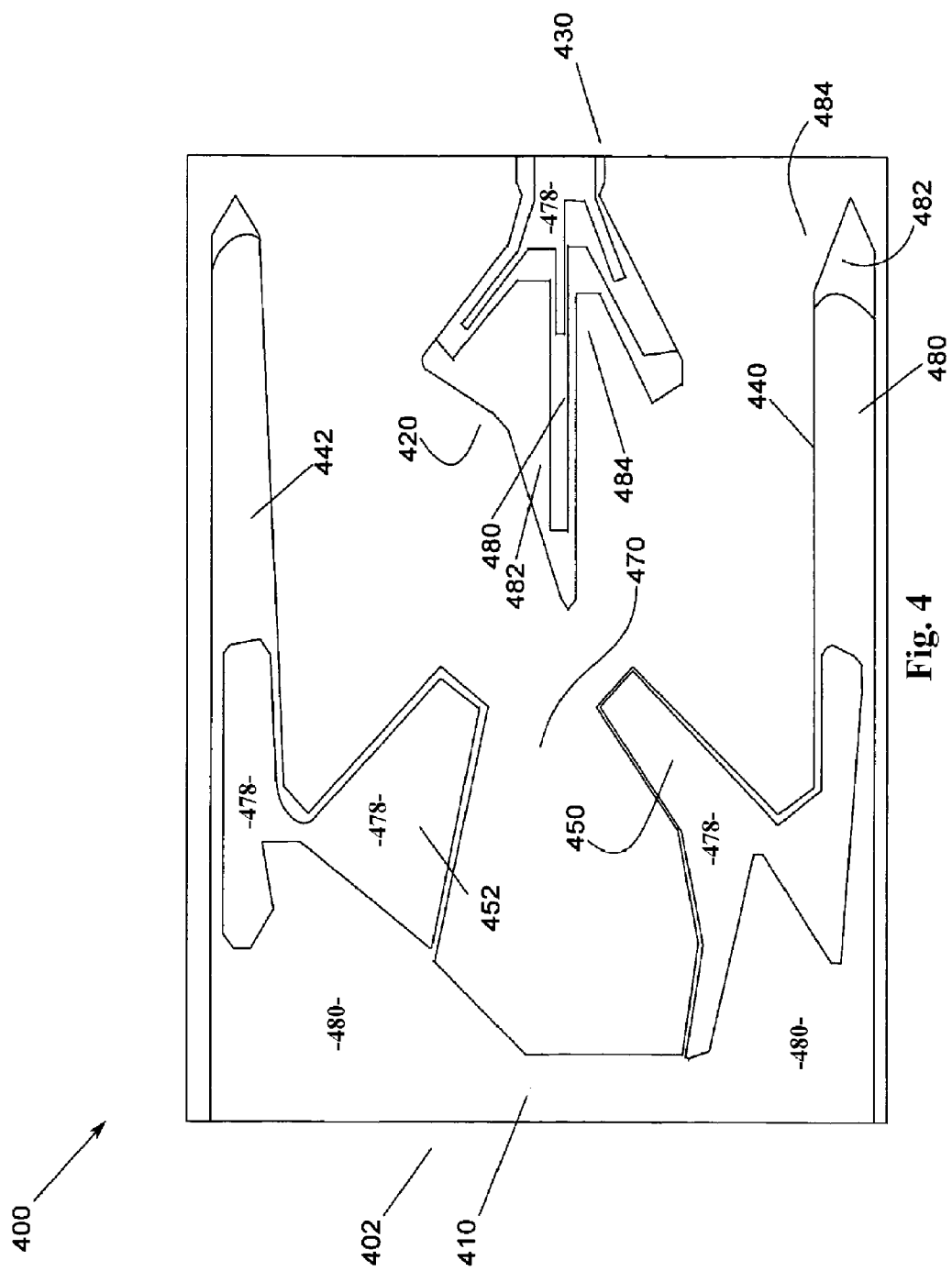
FIG. 4 illustrates a slider design having a three step air bearing with improved fly height performance according to an embodiment of the present invention.

FIG. 4 illustrates a slider design 400 having a three stepped air bearing face with improved fly height performance according to an embodiment of the present invention. In FIG. 4, the slider 400 includes a crossrail 410 and two side rails 440, 442. In FIG. 4, a funnel structure 470 formed by front air bearing structures 450, 452 is provided proximate the leading edge 402. A dual funnel collection feature 420 is provided at the trailing edge 430 to collect air flow. As can be seen in FIG. 4, three etch depths 480, 482, 484 with appropriate step depths are respectively created with increasing distance from the top most air bearing surface. The three etch depths are used to cut slider altitude loss and are respectively produced by first, second and third etch processing steps. The first 480 and second 482 etch depths are preferably 0.15 μm±0.5 μm. The third etch depth 484 is deeper than the first two etch depths 480, 482 and preferably is 2.00 μm±0.5 m. The first etch depth 480 improves speed sensitivity and works with the second etch depth 482 to provide improved altitude performance. The third etch Depth 484 helps improve fly height speed sessitivity.

Figure 5:
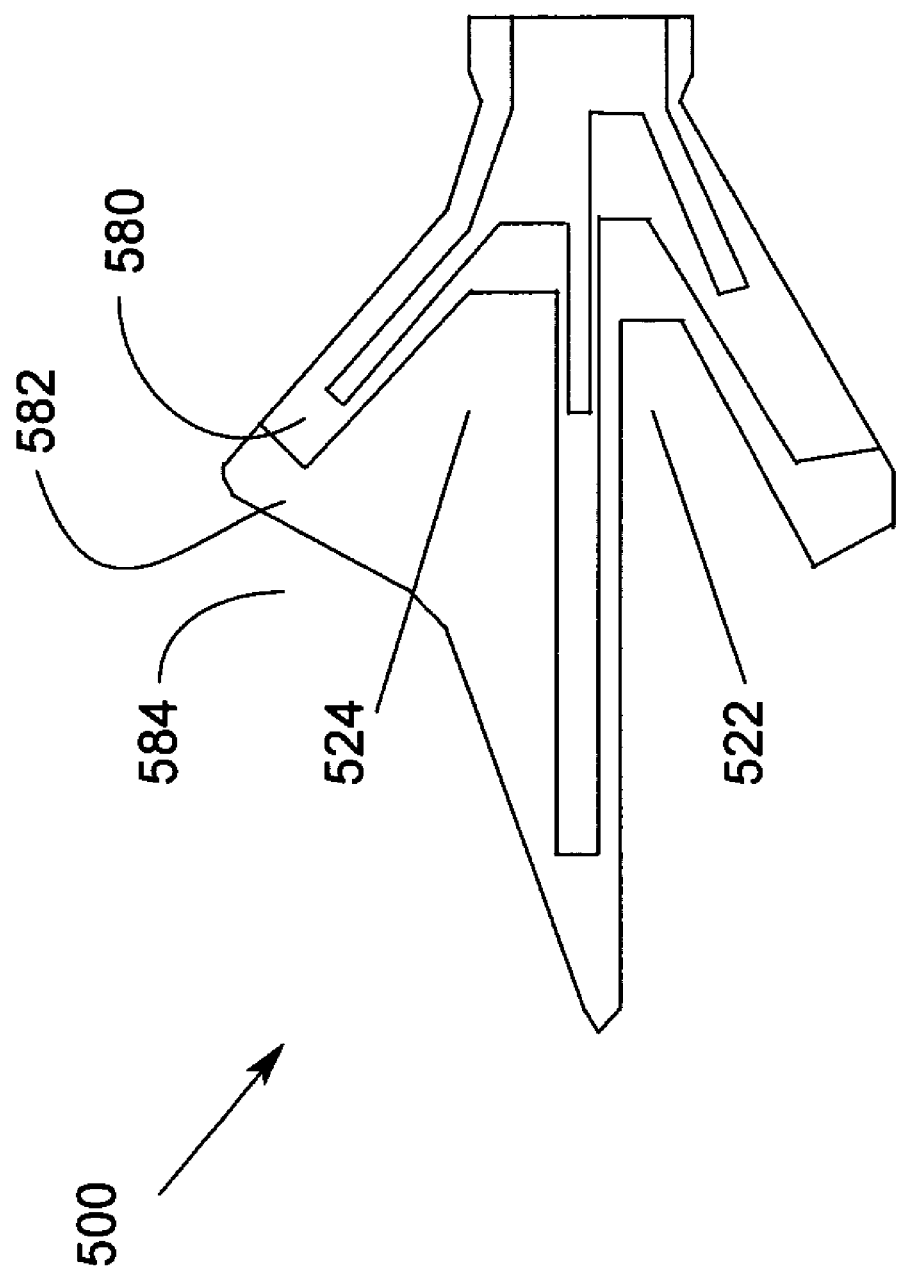
FIG. 5 illustrates the trailing structure for an air bearing with improved fly height performance according to an embodiment of the present invention.

FIG. 5 illustrates the trailing structure 500 for an air bearing with improved fly height performance according to an embodiment of the present invention. As shown in FIG. 5, the trailing structure 500 consists of two funnels 522, 524. The trailing structure 500 also comprises three edge depths 580, 582, 584. The two funnels 522, 524 are provided to collect as much air flow at the trailing end as possible and direct the air flow to the very trailing part of the ABS surface. In this manner, the trailing part of the ABS surface can be decreased dramatically while providing significant improvement in protrusion compensation function and minimum fly height sigma. The trailing structure 500 also helps to decrease ABS area, which decreases contact force. The trailing structure 500 also makes the air bearing much less sensitive to the skew angle change from ID to OD or during seek motion.

Figure 6:
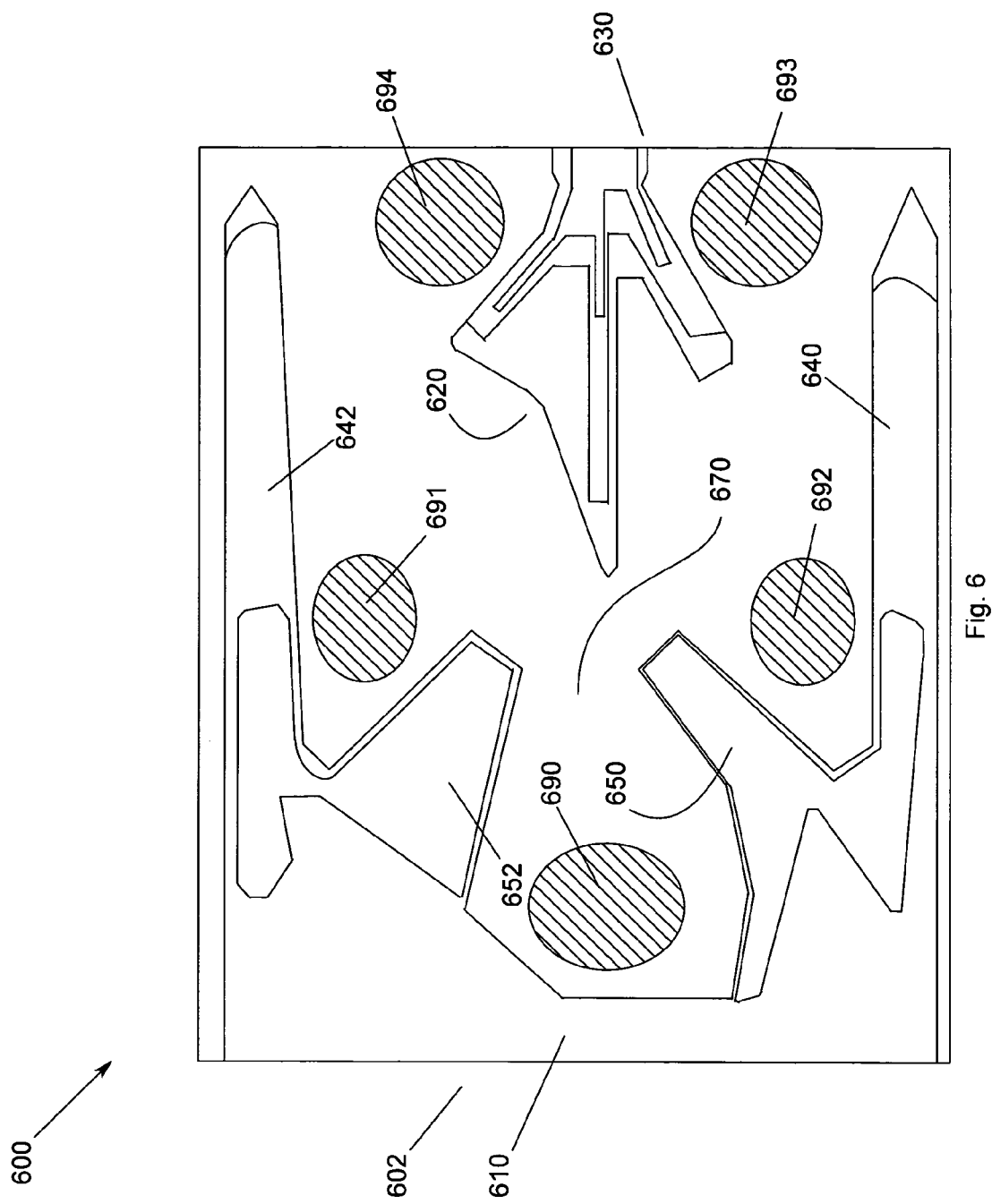
FIG. 6 shows the negative pressure pockets for slider design according to an embodiment of the present invention.

FIG. 6 shows the negative pressure pockets for slider design 600 according to an embodiment of the present invention. In FIG. 6, the slider 600 includes a crossrail 610 and two side rails 640, 642. In FIG. 6, a funnel structure 670 formed by front air bearing structures 650, 652 is provided proximate the leading edge 602. A dual funnel collection feature 620 is provided at the trailing edge 630 to collect air flow. In FIG. 6, five pressure pockets 690-64 are provided. A first negative pressure area 690 is proximate the center-leading edge 602. A second 691 and third 692 negative pressure area are provided near the middle on each side of the slider 600. Two additional negative pressure areas 693, 694 are provided near the trailing edge on each side of the trailing structure 620. The five negative pressure areas 690-64 provide good air bearing stiffness, especially for roll motion. The five negative pressure zones 690-694 also help minimize fly height sigma performance as well as dynamic motions.

Figure 7:
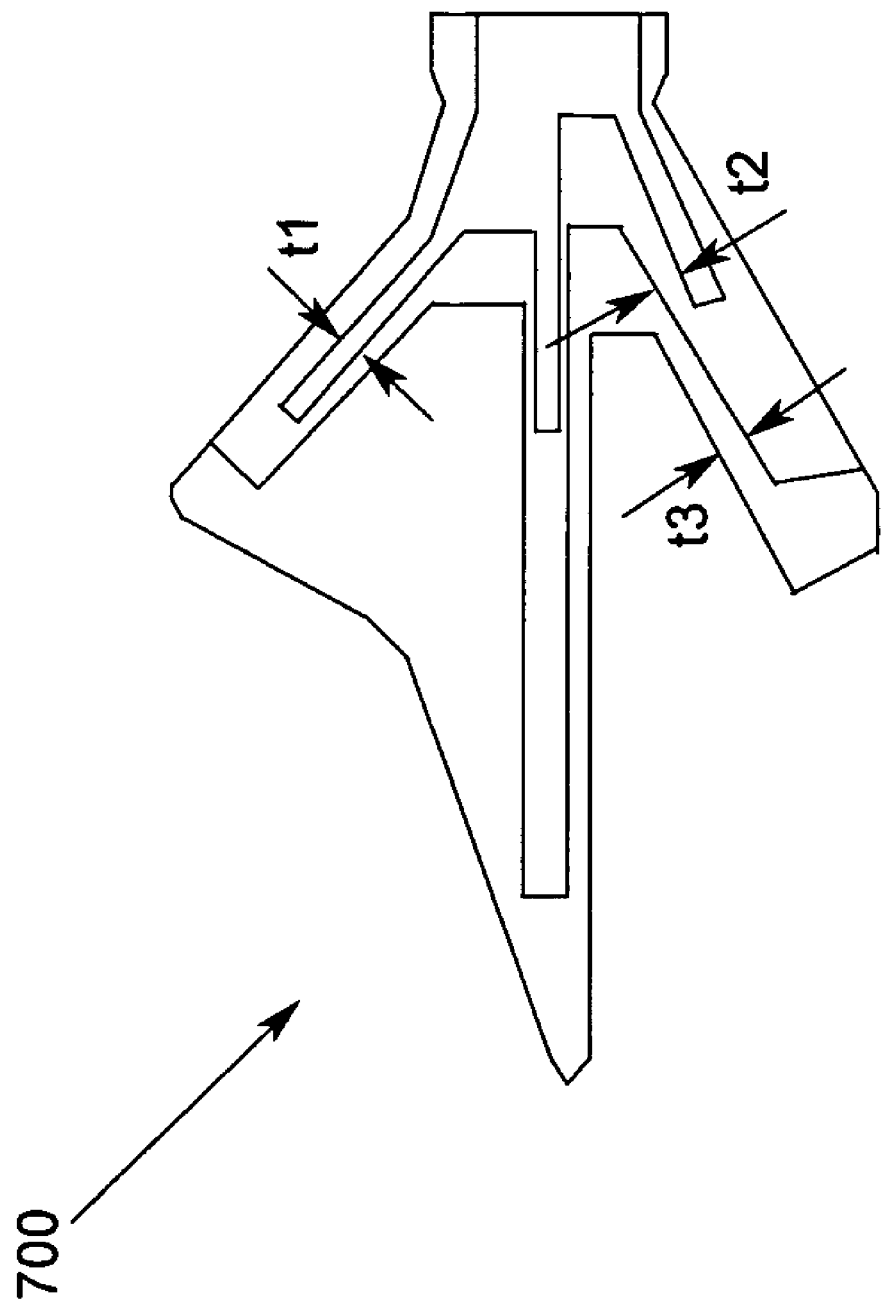
FIG. 7 illustrates the length scales for the trailing edge structure according to an embodiment of the present invention.

FIG. 7 illustrates the length scales 700 for the trailing edge structure according to an embodiment of the present invention. In FIG. 7 three length scales are shown, t1, t2, and t3. The length scale range of t1, t2 and t3 are carefully designed along with three depths to provide significant improvement in altitude loss and speed insensitive performance.

Figure 8:
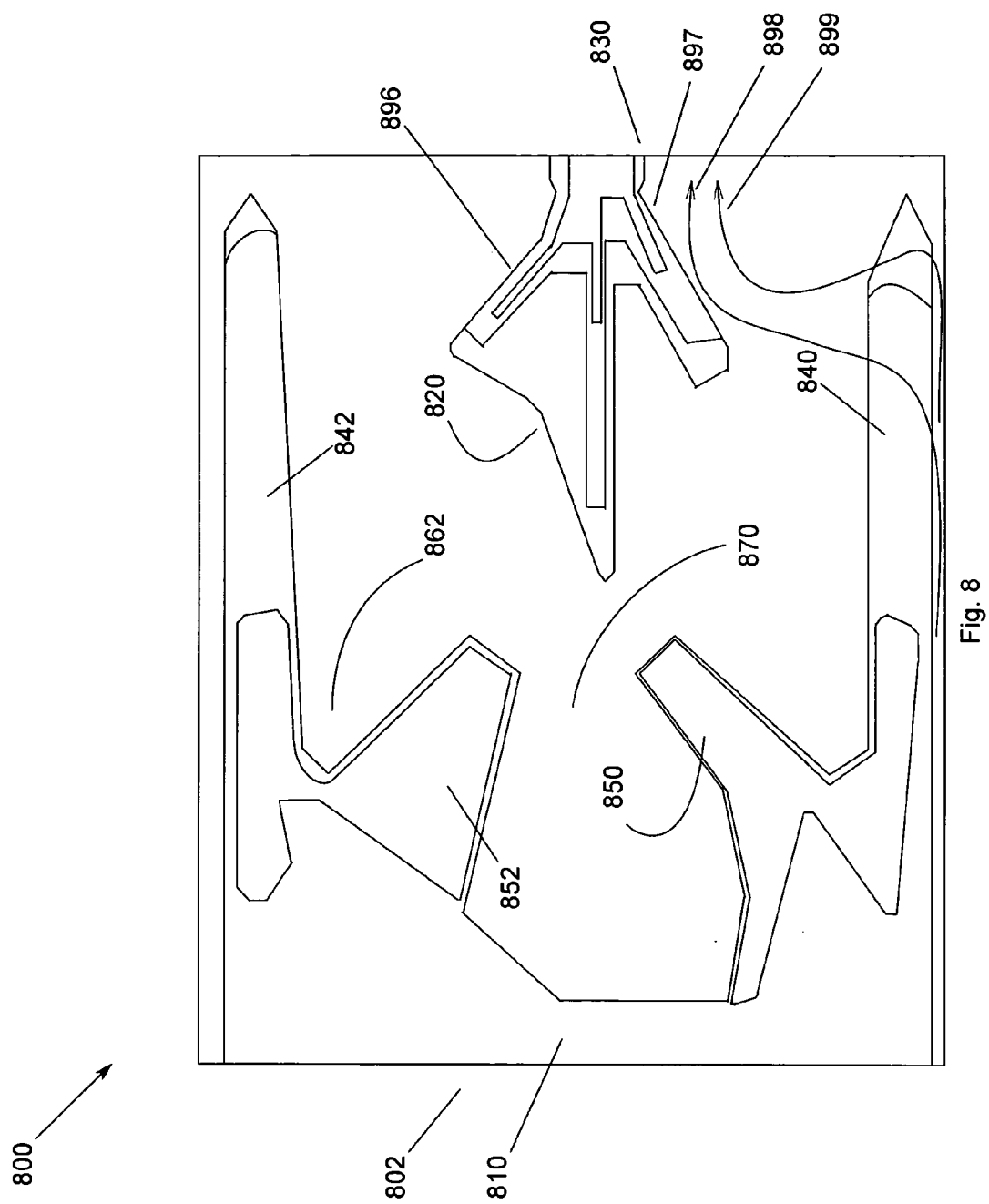
FIG. 8 illustrates the contamination robustness of the three step air bearing design according to an embodiment of the present invention.

FIG. 8 illustrates the contamination robustness of the three step air bearing design 800 according to an embodiment of the present invention. In FIG. 8, the slider 800 includes a crossrail 810 and two side rails 840, 842. In FIG. 8, a funnel structure 870 formed by front air bearing structures 850, 852 is provided proximate the leading edge 802. A dual funnel collection feature 820 is provided at the trailing edge 830 to collect air flow. As can be seen in FIG. 8, the trailing ABS side angles 896, 897 provide contamination robustness. The angles 896, 897 of the trailing features allow air from side, as illustrated by arrows 898, 897, to blow any accumulation of contaminants out of the head/disk interface thereby providing contamination robustness.

Figure 9:
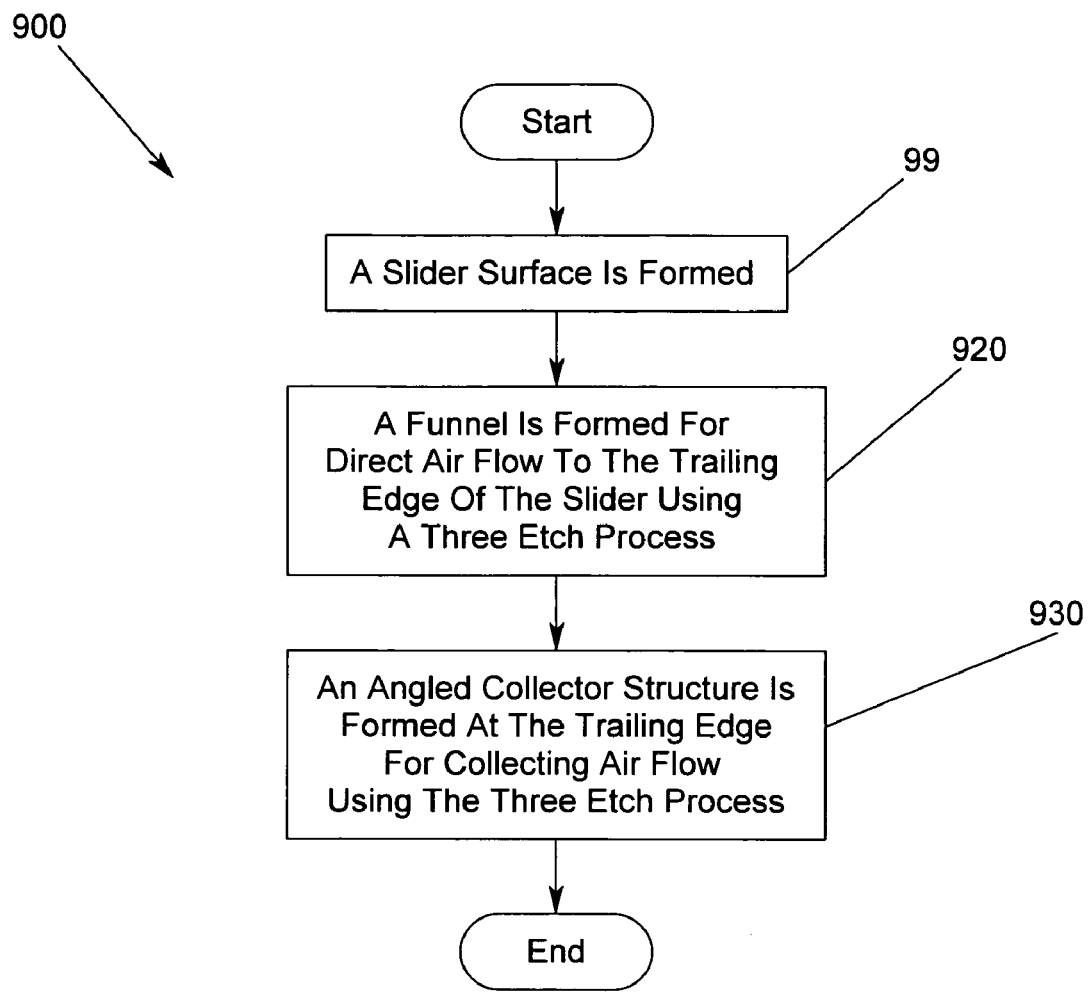
FIG. 9 is a flow chart of a method for providing a three step air bearing with improved fly height performance according to an embodiment of the present invention.

FIG. 9 is a flow chart 900 of a method for providing a three step air bearing with improved fly height performance according to an embodiment of the present invention. A slider surface is formed 910. A funnel is formed for direct air flow to the trailing edge of the slider using a three etch process 920. An angled collector structure is formed at the trailing edge for collecting air flow using the three etch process 930.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A slider for a magnetic storage device, comprising:
   a crossrail having a top surface formed at a first etch depth, the crossrail being disposed along a leading edge of the slider;
   a first funnel structure formed of upstanding converging surfaces above the first etch depth on the crossrail, the upstanding converging surfaces of the first funnel structure configured for directing air flow between the converging surfaces and toward a predetermined location proximate to a trailing edge of the slider; and
   a collection structure disposed proximate the trailing edge of the slider, the collection structure having a second funnel structure having upstanding converging surfaces configured for gathering air flow from the first funnel structure which has been directed to the predetermined location.

2. The slider of claim 1, wherein the first funnel structure comprises a pair of front air bearing structures.

3. The slider of claim 1, wherein the collection structure comprises a third funnel structure configured for collecting air flow.

4. The slider of claim 1, wherein the collection structure comprises three etch depths for forming the second funnel structure and selected to minimize altitude loss.

5. The slider of claim 1, wherein the collection structure comprises a third funnel structure, the second and third funnel structure having a shared central rail having a central axis, the second and third funnel structure further including a side rail angled from the central axis proximate the trailing edge of the slider and extending away from the central axis and toward the leading edge, the second and third funnel structures being configured to include three etch depths and three length scales selected to minimize altitude loss and improve speed insensitivity.

6. The slider of claim 4, wherein a first etch depth is configured to improve speed sensitivity and a second etch depth is configured to provide improved altitude performance.

7. The slider of claim 1, wherein the collection structure is configured to minimize variation in clearance of the air-bearing surface relative to a surface of a recording medium during protrusion of a head element toward the surface of the recording medium.

8. The slider of claim 4, wherein a third etch depth is configured to minimize fly height speed sensitivity.

9. The slider of claim 1, wherein the collection structure is configured to minimize air-bearing surface at the trailing end of the collection structure while minimizing variation in clearance of the air-bearing surface relative to a surface of a recording medium during changes of a skew angle of the slider.

10. The slider of claim 1, wherein the collection structure is configured to decrease contact force.

11. The slider of claim 1 further comprising side rails, and wherein the second funnel structure includes angled sides.

12. The slider of claim 11, wherein the crossrail, funnel structure, side rails and collection structure form five negative pressure areas.

13. The slider of claim 12, wherein the five negative pressure areas provide improved air bearing stiffness.

14. The slider of claim 12, wherein the five negative pressure areas minimize fly height sigma performance.

15. A slider for a magnetic storage device comprising: a crossrail having a top surface formed at a first etch depth, the crossrail being disposed along a leading edge of the slider;
a first funnel structure formed of upstanding converging surfaces above the first etch depth on the crossrail, the upstanding converging surfaces of the first funnel structure configured for directing air flow between the converging surfaces and toward a predetermined location proximate to a trailing edge of the slider; and a collection structure disposed proximate the trailing edge of a slider, the collection structure including a second funnel structure having upstanding converging surfaces configured for gathering air flow from the first funnel structure which has been directed to the predetermined location.

16. The slider of claim 15, wherein the collection structure comprises three etch depths for forming the first funnel structure and selected to minimize altitude loss.

17. The slider of claim 16, wherein a first etch depth is configured to improve speed sensitivity and a second etch depth is configured to provide improved altitude performance.

18. The slider of claim 16, wherein a third etch depth is configured to minimize fly height speed sensitivity.

19. The slider of claim 15, wherein the collection structure is configured to minimize air-bearing surface at the trailing end of the collection structure while minimizing variation in clearance of the air-bearing surface relative to a surface of a recording medium during changes of a skew angle of the slider.

20. The slider of claim 15, wherein the collection structure is configured to decrease contact force.

21. The slider of claim 15 further comprising side rails, and wherein the first funnel structure includes angled sides.

22. The slider of claim 21, wherein the side rails and collection structure form two negative pressure areas.

23. The slider of claim 15, wherein the collection structure is configured to minimize variation in clearance of the air-bearing surface relative to a surface of a recording medium during protrusion of a head element toward the surface of the recording medium.

24. A magnetic storage system, comprising
at least one magnetic storage medium;
a motor for moving the at least one magnetic storage medium;
a slider having a magnetic head mounted thereon for reading and writing data on the at least one magnetic storage medium; and
an actuator, coupled to the slider, for positioning the slider relative to the at least one magnetic storage medium;
wherein the slider further comprises
a crossrail having a top surface formed at a first etch depth, the crossrail being disposed along a leading edge of the slider;
a first funnel structure formed of upstanding converging surfaces above the first etch depth on the crossrail, the upstanding converging surfaces of the first funnel structure configured for directing air flow between the converging surfaces and toward a predetermined location proximate to a trailing edge of the slider; and
a collection structure disposed proximate the trailing edge of the slider, the collection structure having a second funnel structure having upstanding converging surfaces configured for gathering air flow from the first funnel structure which has been directed to the predetermined location.

25. A magnetic storage system, comprising
at least one magnetic storage medium;
a motor for moving the at least one magnetic storage medium;
a slider having a magnetic head mounted thereon for reading and writing data on the at least one magnetic storage medium; and
an actuator, coupled to the slider, for positioning the slider relative to the at least one magnetic storage medium;
wherein the slider further comprises: a crossrail having a top surface formed at a first etch depth, the crossrail being disposed along a leading edge of the slider; a first funnel structure formed of upstanding converging surfaces above the first etch depth on the crossrail, the upstanding converging surfaces of the first funnel structure configured for directing air flow between the converging surfaces and toward a predetermined location proximate to a trailing edge of the slider; and a collection structure disposed proximate the trailing edge of the slider, the collection structure including a second funnel structure having upstanding converging surfaces configured for gathering air flow from the first funnel structure which has been directed to the predetermined location.

26. A method for providing an air bearing pad with improved roll angle sigma, comprising:

forming a slider;

forming a crossrail having a top surface formed at a first etch depth, the crossrail being disposed along a leading edge of the slider;

forming a first funnel structure of upstanding converging surfaces above the first etch depth on the crossrail, the upstanding converging surfaces of the first funnel structure formed at a second etch depth;

configuring the first funnel structure for directing airflow between converging surfaces and toward a predetermined location proximate to a trailing edge of the slider;

forming a collection structure disposed proximate the trailing edge of the slider and having a second funnel structure having upstanding converging surfaces; and configuring the second funnel structure for gathering airflow from the first funnel structure which has been directed to the predetermined location.

* * * * *